Oct. 27, 1970 C. CURTI 3,535,889
APPARATUS FOR THE CONTINUOUS PRODUCTION OF FROZEN COMESTIBLES
Filed June 26, 1967 2 Sheets-Sheet 1

INVENTOR
CARLO CURTI

BY Silverman & Cass
ATTYS.

United States Patent Office 3,535,889
Patented Oct. 27, 1970

3,535,889
APPARATUS FOR THE CONTINUOUS PRODUCTION OF FROZEN COMESTIBLES
Carlo Curti, Milan, Italy, assignor to O.T.E.M., Milan, Italy, a corporation of Italy
Filed June 26, 1967, Ser. No. 648,559
Claims priority, application Italy, June 25, 1966, 19,477/66
Int. Cl. F25c 7/04
U.S. Cl. 62—322                                    7 Claims

ABSTRACT OF THE DISCLOSURE

An apparatus and method for the continuous production of frozen comestibles. The apparatus has a movable platform from which a plurality of molds are suspended. The molds may be of various shapes each having an open end, at the top thereof. The molds are sequentially filled with the various products that comprise the comestible which is to be frozen. The suspended molds are conveyed first through a freezing cycle and then through a defrosting cycle. The freezing cycle includes spraying the molds containing the comestible with a coolant at a temperature well below the freezing point of the comestible. After the comestible is solidified, the mold passes through the defrosting cycle which is of a substantially shorter duration than the freezing cycle but of a sufficient duration to release the frozen comestible from the inner surface of the mold. The defrosting cycle, like the freezing cycle, is achieved by spraying a solution on the molds, however in the case of the defrosting cycle hot water is used instead of the aforementioned coolant.

BACKGROUND OF THE INVENTION

This invention relates to an apparatus and a method for the continuous production of frozen comestibles, such as ice cream, ice milk and flavored frozen water lollies.

Existing machines for producing ice cream, ice milk, and frozen flavored water lollies generally comprise a rotating platform from which a plurality of molds are suspended, the molds being conveyed first through a freezing bath and then through a defrosting bath. Prior art machines usually provide for said baths by utilizing individual or separate tanks filled with the freezing or defrosting solution, whichever the case may be. In these machines, in order to convey the molds from the freezing cycle to the defrosting cycle it is necessary for the molds to be physically lifted out of the freezing bath and inserted into the defrosting baths. While this method produced a satisfactory product, if for some reason the rotating platform should stop, for example due to mechanical failure, it was necessary that the operator immediately drain the respective tanks or baths in order to prevent the lollies in the molds from being ruined. The process of draining and refilling the tanks with the freezing and defrosting solutions is not only time consuming and expensive, but must be effected in a rather short period of time to prevent the solidified or completed lollies in the molds from melting.

Other types of machines have been used, one of which had doors fitted into the ends of the freezing bath, facing the defrosting zone through which the molds could pass. However, this method was not feasible in that the passageway between the two baths would have to be quite long in order to prevent the refrigerating brine from entering the defrosting bath.

Another method that has been utilized to eliminate the inconvenience and complications of lifting the molds out of the freezing bath and inserting them into the defrosting bath was to keep the molds in one or more sealed chambers and rotate the molds around a stationary axle, into each of these molds would be successively added an evaporated refrigerant liquid followed, after the fumes and liquid residue had been removed, by a warm vapor which could be the vapor of the same refrigerating liquid but adequately compressed.

The most common machines found for the production of frozen, shaped comestibles particularly ice cream, ice milk and flavored frozen water lollies utilized the previously mentioned method wherein the molds were physically transferred from the freezing bath to the defrosting bath. These machines normally comprise a rotating platform from which the molds are suspended while passing through the freezing bath and the defrosting bath. The construction of these machines is such that the freezing bath or cycle extends a little less than 360°, the defrosting bath is adjacent to and between the ends of the freezing bath completing a circular configuration. The machines have provisions for filling the molds and evacuating the contents of the mold, these functions being performed during the rotation of the mold through the freezing cycle. These machines are commonly referred to as "merry-go-round" machines, and are particularly found in Europe.

A typical process for producing frozen ice cream lollies comprises the following steps; steps a to f being performed while the molds are suspended in the freezing bath:

(a) The molds are filled with a syrup which is to form the outer coating of the lolly;

(b) After a predetermined time the syrup is withdrawn from the mold, leaving a solidified coating which adheres to the mold;

(c) The mold is next filled with ice cream or a derivative product which is to be frozen;

(d) Prior to complete solidification the sticks are inserted into the lolly;

(e) At a predetermined time, a third product is added to the mold to complete the lolly;

(f) The lolly is then completely solidified;

(g) The lolly is next inserted into a defrosting bath in order to slightly melt or defrost the portions thereof adjacent to the inner wall of the mold to facilitate release of the lolly from the mold;

(h) Finally the lolly is removed from the mold and transferred to the wrapping or packaging apparatus.

Steps may be added to or deleted from the above process to suit the particular product which is desired.

The table or merry-go-round must, of course, carry out a succession of advancements and stops in a fixed sequence so that the various phases occur at preset times. Under these circumstances, if the sequence of operation is interrupted for a short time for any reason, the contents of the molds in the freezing bath would freeze solid, while those lollies in the defrosting bath would melt. Thus, the syrup in the molds instead of forming a thin outer coating would freeze solid and could not later be withdrawn from the mold; insertion of the stick would be complicated, if not impossible, due to the fact that the contents of the mold may be too solid. Also, subsequent fillings of the mold would cause the contents therein to overflow.

Therefore, it is apparent that existing machines for the continuous production of ice cream or frozen comestibles, when stopped for one reason or another would have an undesirable effect. The applicant has overcome this problem by providing for the freezing brine and defrosting solution to be sprayed against the molds. If for some reason the machine has to be stopped, it is very simple to stop the sprays and the whole operation remains constant until the machine is ready to go again. In addition, the present apparatus also does away with the time consuming step of lifting the molds from the freezing bath to the defrosting bath.

The hygienic and esthetic requirements of today require a wrapping machine for frozen comestibles which wraps the product in a roll of paper and closes it on all sides. Automation requires synchronization of the wrapping machine and the frozen comestible producing machine where, preferably, the wrapping machine is a pilot to the frozen comestible producing machine. This was not possible with the frozen comestible producing machines of the prior art because the freezing could not be readily stopped or started, at least not without a high percentage of waste.

The ice cream producing machine made according to the invention would permit ready stopping and starting of the freezing in the merry-go-round sectors where the operations for preparing the frozen bodies take place; at the same time allowing the freezing effect in the parts of the merry-go-round housing the molds containing already formed and frozen bodies to continue; this would then allow the forming of a unit, producing already wrapped products where the wrapping machine would act as the pilot machine.

SUMMARY OF THE INVENTION

It is an important object of this invention to provide an apparatus for the continuous production of frozen comestibles which will substantially eliminate the foregoing disadvantages as well as others.

It is a further object of this invention to provide an apparatus for the continuous production of frozen comestibles in which the molds do not have to be physically lifted out of freezing bath and inserted into the defrosting bath.

It is a further object of this invention to provide an apparatus which is particularly suited for working with a wrapping machine.

It is a further object of this invention to provide an apparatus where a short unforeseen break in the movement of the molds would not ruin the contents of the molds.

Still another object of the invention is to provide apparatus for the continuous production of frozen comestibles which utilizes a spraying system for the freezing and defrosting cycle.

Many other objects will occur to those skilled in this art, as a detailed specification of a preferred embodiment of the invention is set forth in connection with the accompanying drawings.

DESCRIPTION OF THE PREFERRED EMBODIMENT

Figure 1:
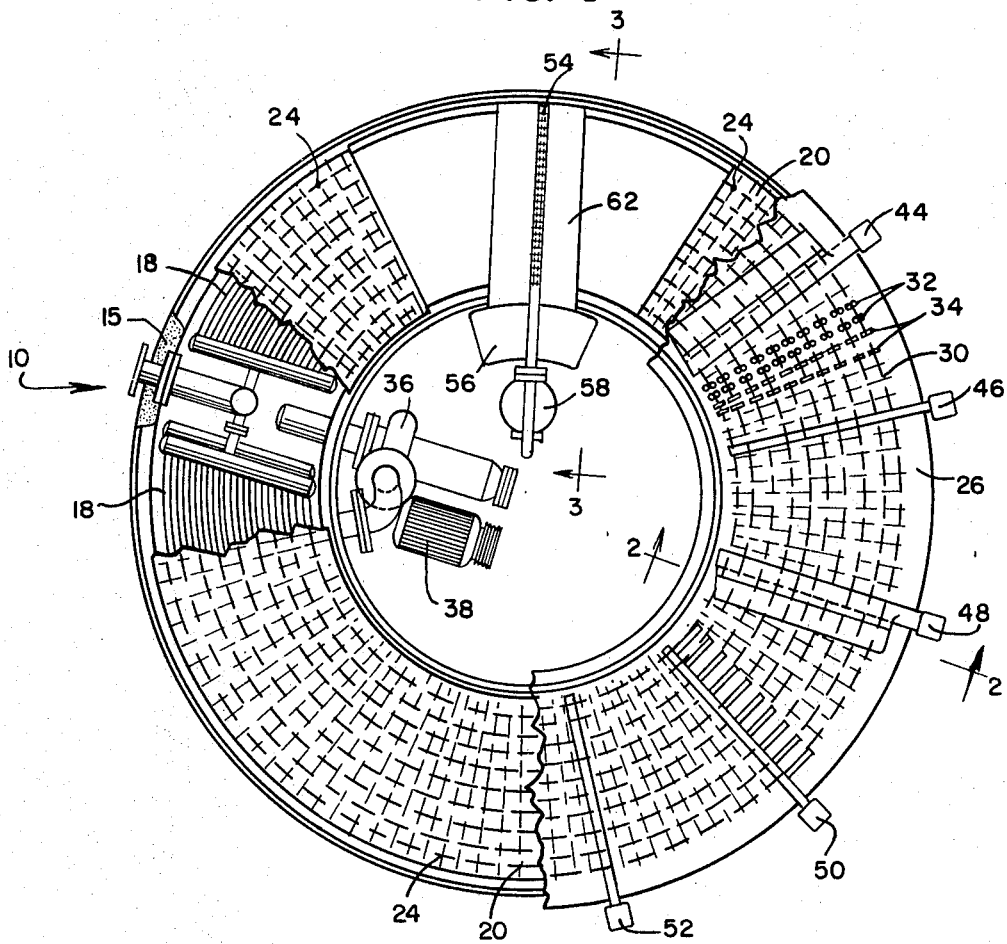
FIG. 1 is a top plan view of the apparatus with a portion of the rotating table and a portion of the brine container cover broken away.
Figure 3:
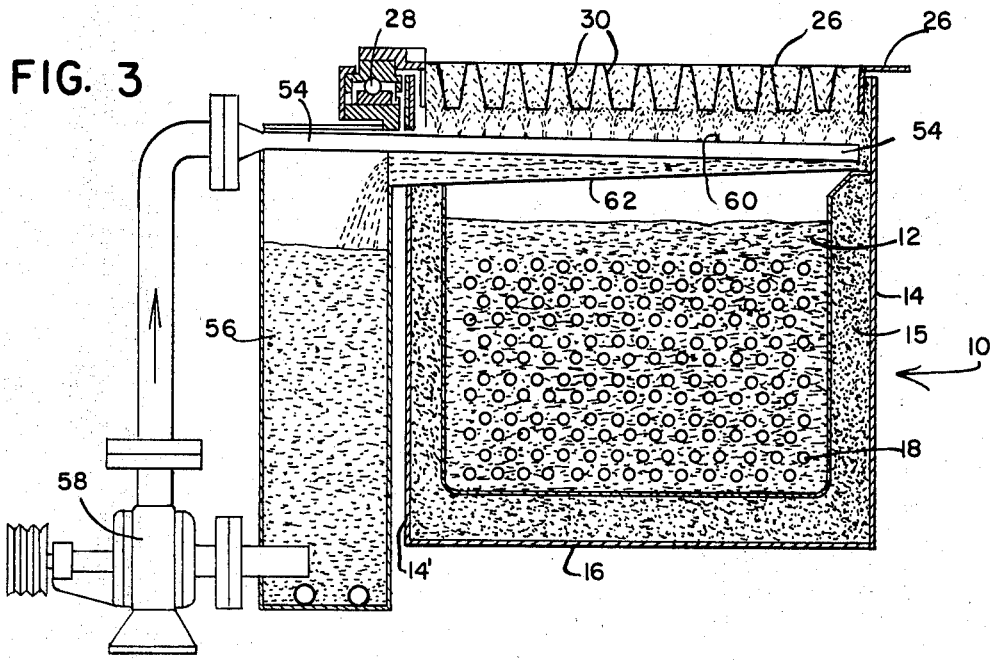
FIG. 3 is a sectional view taken through the apparatus along the line 3—3 of FIG. 1 and in the general direction indicated, with the molds shown in elevation.
Figure 2:
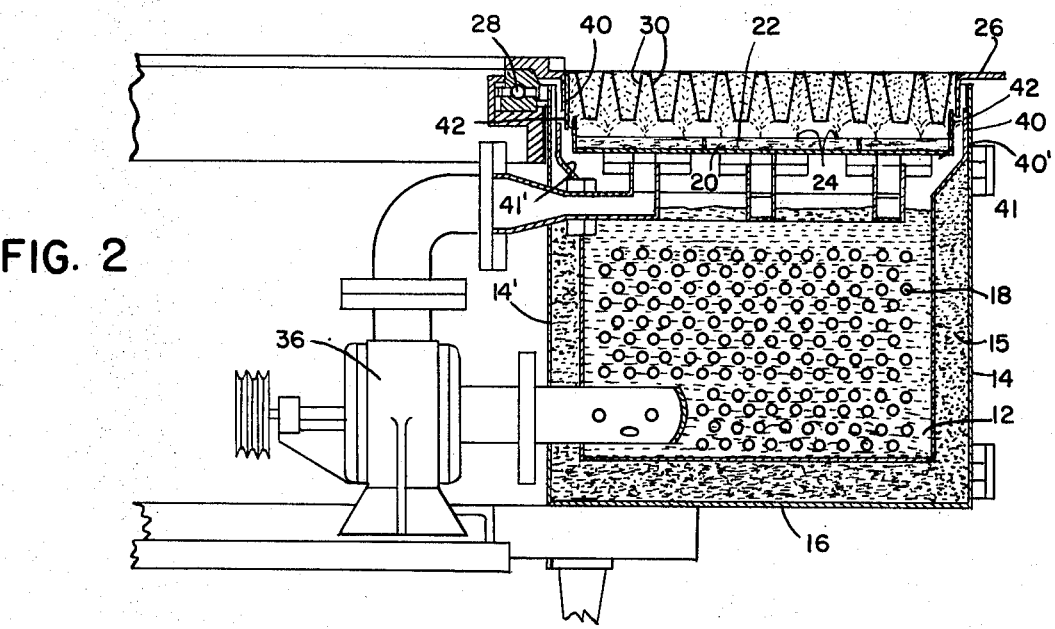
FIG. 2 is a sectional view taken through the apparatus along the line 2—2 of FIG. 1 and in the general direction indicated, with the molds shown in elevation.

Referring now to the drawings, in FIGS. 1 and 2, the coolant container 10 is of a circular configuration having side walls 14 and 14', and bottom wall 16. The walls 14, 14' and 16 which comprise the container 10 are thermically insulated by insulating material 15 as seen in FIGS. 2 and 3. Although the embodiment illustrated utilizes a circular configuration for the coolant container, it may be understood that other suitable geometric configurations can be used for the brine container 10, such as rectangular, for instance. On the inside of the brine container 10, are refrigerating tubes 18 which are part of the refrigeration, heat exchanging system, removing the heat from a brine or other coolant solution 12 in container 10. The refrigerating tubes 18 are of a circular configuration as is the coolant container 10, and extend less than 360° of container 10.

The coolant 12 is pumped into coolant conveying ducts 20 having covers 22. The covers 22 have a plurality of holes 24. The holes 24 are represented in FIG. 1 by the intersection of the dotted concentric and radial lines.

A movable platform 26 otherwise known as a merry-go-round, is supported horizontally by a plurality of roller bearings 28. The roller bearings 28 are equidistantly placed around the internal wall 14' of the brine container 10. Molds 30, are suspended from the platform 26 so that they are spaced above the container covers 22. The molds 30 are distributed on the rotating platform 26 as represented in FIG. 1 where the dotted circumferential and radial lines meet. The axes of the molds 30 and the axes of holes 24 are staggered with respect to each other. The molds 30 may have several transverse sections as seen in FIG. 1, rows 32 and 34.

A pump 36 which is driven by a motor 38 supplies the coolant 12, under pressure to the ducts 20. The pump pressure is such that the coolant 12 is sprayed outwardly through the holes 24 and strikes the molds 30 which are suspended from the platform 26 as seen in FIG. 2. The brine solution 12 after striking the molds 30 settles on the surface of covers 22 and is held there by a pair of double lateral sides 40 and 40' which are provided about the inner and outer periphery of attached covers 22. The brine solution 12 sprayed from the holes 24 agitates brine solution which has settled on covers 22 causing it also to splash against the molds 30, to further enhance the cooling effect upon the molds.

When the brine solution 12 reaches the upper edges of the lateral sides 40, it will overflow and run down the two chutes 41 and 41' into the coolant container 10. The chutes 41 and 41' are formed by the lateral sides 40 and 40'. A tongue 42, is suspended from platform 26 between walls 40 and 40'. The two lateral walls 40 and 40' and the tongue 42 suspended from the platform 26 form a type of labyrinth seal.

The bottom of the tongue 42, is slightly inclined inwardly in order to direct the brine solution into the brine container 10. The brine solution 12 is cooled and recirculated from the container by the coolant pump 36. With reference to FIG. 1, a first filling device 44 is provided for filling the molds with the comestible to be frozen, for example the syrup which is to form the outer coating of an ice cream bar. A first evacuating device 46 is for partially evacuating the mold of the syrup, a thin coating adhering to the sides of the mold. A second filling device 48 is provided for filling the mold with another comestible which is to be frozen. A stick inserting device 50 is used to insert the sticks into the comestible after initial freezing has taken place, but prior to completion of the freezing cycle. A third-filling device 52 is used to form the base of an ice cream lolly.

The material or comestible in the molds is frozen by the coolant solution being sprayed against the sides of of the mold through the holes 24 of the duct covers 22. It is understood that the mold may be filled with one or several comestibles depending on the particular product desired. For example, a popsicle which is frozen flavored water can easily be made by pouring the flavored solution into a mold and then freezing it.

After freezing the comestible, it must be removed from the mold. In order to achieve this, the mold is subjected to a defrosting cycle.

Referring now to FIG. 3, a hot water distribution pipe 54 is fed from a water reservoir 56 which is maintained at the required temperature by methods well known in the art and is located adjacent to the brine tank 10. The hot water is supplied under pressure to pipe 54 by the pump 58, after which it passes through the holes 60 in pipe 54. The hot water spray covers the frozen molds and partially defrosts the contents immediately adjacent the inner wall of the mold so that the frozen comestible may be extracted therefrom. The extraction of the comestibles from the molds is achieved by methods which are well known in this art.

A return system for the defrosting liquid is provided by a gutter 62 which is located under the spray pipe 54. Gutter 62 collects the water as it falls from the sides of the molds and returns it back to the reservoir 56 for reheating and recirculation.

The apparatus as described above in the preferred embodiment eliminates a major problem of this art, which is the necessity for lifting the molds from freezing bath to the defrosting bath. If for any reason, in prior art machines, the freezing cycle were to stop, the contents in each mold would continue to freeze, in all probability beyond the desired amount and therefore subsequent operations such as filling and insertion of the stick would be impeded. It is apparent from the operation of this machine, that if, for any reason, the moving or rotating platforms were to stop, the freezing action on all phases of the filling process could be stopped so that, the problem would be remedied and the entire process started again without endangering the contents of the molds.

Only one coolant distribution group has been illustrated in conjunction with the preferred embodiment. It is apparent, that if necessary, the single distribution system could be subdivided into two or more distribution systems, each one having its own pump and coordinated with the complete process.

It is believed that the invention has been described in such details as to enable those skilled in the art to understand the same, and it will be obvious that variations or modifications may be made without departing from the spirit or scope of the invention as defined in the appended claims.

What is desired to secure by Letters Patent in the United States is:

1. Apparatus for the continuous production of frozen comestibles which includes means for filling molds with said comestibles, inserting sticks into the filled molds, and removing the frozen comestibles from the molds, said apparatus further comprising, a container for holding a coolant, a movable platform mounted above said coolant container, said coolant container having a plurality of said molds containing said comestibles suspended therefrom, means for maintaining said coolant at a desired temperature, coolant conveying ducts disposed over said container, said ducts having cover members, said cover members having a pluraity of holes provided therein, means for supplying said coolant under pressure to said ducts such that said coolant is forced through said holes to strike the sides of said molds to solidify said comestibles therein as the platform is moved past said holes, said cover members being provided with pairs of double lateral sides on the inner and outer peripheries thereof such that the coolant falling from said molds is retained on said cover members between said lateral walls and the coolant emanating from said holes agitates the retained coolant causing said retained coolant to splash against said molds to enhance freezing of said comestibles, and means for spraying defrosting fluid on the sides of said molds for partially defrosting said comestibles from the inner surface of said molds to facilitate removal of the frozen comestibles from said molds.

2. Apparatus as claimed in claim 1 in which said molds are staggered relative said holes so that said coolant will strike the sides of said molds.

3. Apparatus as claimed in claim 1 in which said means for spraying defrosting fluid comprise a reservoir adjacent said coolant container, defrosting fluid conveying means disposed over said reservoir, said defrosting fluid conveying means having a plurality of spray apertures provided therein, and means for supplying said defrosting fluid under pressure to said defrosting fluid conveying means.

4. Apparatus as claimed in claim 3 in which a return gutter is provided below said defrosting fluid conveying means to collect the defrosting fluid as it falls from the sides of said molds and return said defrosting fluid to said reservoir.

5. Apparatus as claimed in claim 3 in which said molds are staggered relative said spray apertures so that said defrosting fluid will strike the sides of said molds.

6. Apparatus as claimed in claim 3 in which said defrosting fluid is hot water.

7. Apparatus as claimed in claim 1 wherein tongues are attached to said movable platform at the inner and outer periphery thereof, said tongues being disposed between said lateral sides forming a labyrinth seal.

References Cited

UNITED STATES PATENTS

| | | | |
|---|---|---|---|
| 2,614,403 | 10/1952 | Heise | 62—380 X |
| 2,014,550 | 9/1935 | Birdseye | 62—345 X |
| 2,247,865 | 7/1941 | Zarotschenzeff et al. | 62—345 X |
| 2,685,177 | 8/1954 | Wagner | 62—345 |
| 2,744,731 | 5/1956 | Brandt | 165—9 |
| 2,791,890 | 5/1957 | Hoyer | 62—345 |
| 3,261,178 | 7/1966 | Okada | 62—345 |

WILLIAM E. WAYNER, Primary Examiner

U.S. Cl. X.R.

62—345, 381